(12) United States Patent
Wetzler et al.

(10) Patent No.: US 10,963,041 B2
(45) Date of Patent: *Mar. 30, 2021

(54) GESTURE RECOGNITION USING MULTI-SENSORY DATA

(71) Applicant: TECHNION RESEARCH & DEVELOPMENT FOUNDATION LIMITED, Haifa (IL)

(72) Inventors: Aaron Wetzler, Rishon LeTsiyon (IL); Ron Kimmel, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,980

(22) Filed: Feb. 20, 2020

(65) Prior Publication Data

US 2020/0192464 A1 Jun. 18, 2020

Related U.S. Application Data

(63) Continuation of application No. 15/543,092, filed as application No. PCT/IL2016/050202 on Feb. 22, 2016, now Pat. No. 10,606,341.

(Continued)

(51) Int. Cl.
*G06K 9/00* (2006.01)
*G06F 3/01* (2006.01)
(Continued)

(52) U.S. Cl.
CPC .................. *G06F 3/01* (2013.01); *G06F 3/00* (2013.01); *G06F 3/017* (2013.01); *G06F 3/0304* (2013.01);
(Continued)

(58) Field of Classification Search
CPC . G06F 3/01; G06F 3/00; G06F 3/0304; G06F 3/017; G06K 9/62; G06K 9/00355; G06K 9/00389; G06K 9/6282; G06K 9/78
(Continued)

(56) References Cited

U.S. PATENT DOCUMENTS 8,543,240 B2 9/2013 Itkowitz et al.
9,122,354 B2 9/2015 Sharma
(Continued)

FOREIGN PATENT DOCUMENTS

WO 2014058909 A2 4/2014

OTHER PUBLICATIONS

Aspvall, et al: "Khachiyan's Linear Programming Algorithm", Journal of Algorithms, vol. 1, pp. 1-13, Dec. 7, 1979.
(Continued)

*Primary Examiner* — Charlotte M Baker
(74) *Attorney, Agent, or Firm* — The Roy Gross Law Firm, LLC; Roy Gross

(57) ABSTRACT

A system comprising: a camera configured to capture one or more images of a user's hand; and a computer configured to: receive the one or more captured images, apply a mapping function to the received one or more images, thereby yielding one or more coordinates associated with at least one feature of the user's hand, wherein the mapping function is derived from a set of labeled images that are produced by applying a machine learning algorithm to training data which comprises images of a trainer's hand, wherein the images are labeled with coordinates obtained from multiple magnetic sensors attached to the trainer's hand.

20 Claims, 11 Drawing Sheets

Related U.S. Application Data

(60) Provisional application No. 62/119,226, filed on Feb. 22, 2015.

(51) Int. Cl.
  *G06K 9/78* (2006.01)
  *G06K 9/62* (2006.01)
  *G06F 3/00* (2006.01)
  *G06F 3/03* (2006.01)

(52) U.S. Cl.
  CPC ..... *G06K 9/00355* (2013.01); *G06K 9/00389* (2013.01); *G06K 9/62* (2013.01); *G06K 9/6282* (2013.01); *G06K 9/78* (2013.01)

(58) Field of Classification Search
  USPC ........................................................ 382/103
  See application file for complete search history.

(56) References Cited

U.S. PATENT DOCUMENTS

| | | |
|---|---|---|
| 2015/0043092 A1 | 2/2015 | Suzuki |
| 2015/0177842 A1 | 6/2015 | Rudenko |

OTHER PUBLICATIONS

Everingham, et al: "The Pascal Visual Object Classes (VOC) Challenge", International Journal of Computer Vision, vol. 88 pp. 303-338, Sep. 9, 2009.

Jarrett, et al: "What is the Best Multi-Stage Architecture for Object Recognition?", International Conference on Computer Vision (ICCV), pp. 2146-2153. (IEEE) 2009.

Jia, et al: "Caffe: Convolutional Architecture for Fast Feature Embedding", arXiv preprint arXiv:1408.5093, (2014).

Keskin, et al: "Real Time Hand Pose Estimation Using Depth Sensors", Consumer Depth Cameras for Computer Vision, pp. 119-137. (2013).

Lepetit, et al: "EPnP: An Accurate O(n) Solution to the PnP Problem" International Journal of Computer Vision, pp. 155-166, (2009).

Leutenegger, et al: "BRISK: Binary Robust Invariant Scalable Keypoints", International Conference on Computer Vision (ICCV), pp. 2548-2555, (IEEE) 2011.

Shotton, et al: "Real-Time Human Pose Recognition in Parts from Single Depth Images", Communications of the ACM, vol. 56, No. 1, pp. 116-124, (2013).

Tompson, et al: "Real-Time Continuous Pose Recovery of Human Hands Using Convolutional Networks", ACM Transactions on Graphics, (2014).

Wetzler, et al: "Rule of Thumb: Deep derotation for improved fingertip detection", Proceedings of the British Machine Vision Conference (BMVA Press), Sep. 12, 2015.

International Search Report and Written Opinion of the International Searching Authority, International Application No. PCT/IL2016/050202, dated Jun. 1, 2016.

Berman, et al: "Sensors for Gesture Recognition Systems," Transactions on Systems, Man, and Cybernetics, Part C (Applications and Reviews), vol. 42, No. 3, pp. 277-290, (2012).

GESTURE RECOGNITION USING MULTI-SENSORY DATA

CROSS-REFERENCE TO RELATED APPLICATION/S

This application is a continuation of U.S. patent application Ser. No. 15/543,092 filed Jul. 12, 2017, which is a national phase of PCT Patent Application No. PCT/IL2016/050202 having international filing date of Feb. 22, 2016, which claims the benefit of priority of U.S. Provisional Patent Application No. 62/119,226 filed Feb. 22, 2015 and entitled "Gesture Recognition Using Multi-Sensory Data", the contents of which are incorporated herein by reference in their entirety.

FIELD OF THE INVENTION

The invention relates to the field of computerized gesture recognition.

BACKGROUND

Gesture recognition has gained in popularity in a wide range of applications, from user interfaces (UIs) to enhanced computer animation. One common technique to implement gesture recognition relies on supervised machine learning for classifying and identifying gestures performed by a user. However, successful application of this technique requires consideration of several issues.

An adequate training set must be built to produce a reliable classification function. Noise and distortion of the detected gesture and of the underlying training set may inhibit reliable identification and classification.

Hand gestures, with twenty nine degrees of motion are particularly challenging to classify. A machine learning process for such a complex tasks typically requires a large amount of training data where to faithfully represent the camera noise, and hand-finger locations and orientations that would be observed in a non-controlled scenario.

Typical techniques to acquire training data use visual markers such as painted gloves, stickers, reflectors or LEDs attached to different parts of the hand or a hand glove for observation by one or more cameras. The positions and orientations of the hand and fingers may then be extracted from this visually tracked data. However, visually captured data suffers from occluded markers due to the dimensions and articulation possibilities of the human hand, resulting in incomplete data. Additionally the visual markers themselves may distort the true hand profile and/or impede natural hand motion, compromising the training data.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising: a camera configured to capture one or more images of a user's hand; and a computer configured to: receive the one or more captured images, apply a mapping function to the received one or more images, thereby yielding one or more coordinates associated with at least one feature of the user's hand, wherein the mapping function is derived from a set of labeled images that are produced by applying a machine learning algorithm to training data which comprises images of a trainer's hand, wherein the images are labeled with coordinates obtained from multiple magnetic sensors attached to the trainer's hand.

In one embodiment, the feature comprises a digit of the user's hand.

In one embodiment, the feature comprises a joint of the user's hand.

In one embodiment, the system further comprises a calibration system that is configured to calibrate the multiple magnetic sensors with a trainer's camera that is configured to capture the images of the trainer's hand.

There is provided, in accordance with an embodiment, a method, comprising: applying a mapping function to one or more captured images of a user's hand; and producing, from the application of the mapping function, one or more coordinates associated with at least one feature of the user's hand, wherein the mapping function is derived from a set of labeled images that are produced by applying a machine learning algorithm to training data which comprises images of a trainer's hand, and wherein the images are labeled with coordinates obtained from multiple magnetic sensors attached to the trainer's hand.

In one embodiment, the feature comprises a digit of the user's hand.

In one embodiment, the feature comprises a joint of the user's hand.

In one embodiment, the method further comprises calibrating the multiple magnetic sensors with a trainer's camera, and capturing the images of the trainer's hand using the trainer's camera.

There is provided, in accordance with an embodiment, a method for creating a labeled data set for a hand, comprising: obtaining optical image data of a trainer's hand; obtaining magnetic image data corresponding to the optical image data; identifying a position attribute from the magnetic image data corresponding to the optical image data, wherein the attribute is not represented in the optical image data; labeling the optical image data using the position attribute, thereby creating a labeled image data set; and applying a machine learning algorithm to the labeled image data set to produce a mapping function.

In one embodiment, the method further comprises calibrating a trainer's camera with multiple magnetic sensors, wherein the optical image data is captured using the trainer's camera and wherein the magnetic image data is captured using the multiple magnetic sensors.

In one embodiment, the multiple magnetic sensors comprise low profile sensors.

In one embodiment, the mapping function is applied to an image of a user's hand to yield one or more coordinates associated with at least one feature of the user's hand.

There is provided, in accordance with an embodiment, a system for creating a labeled data set for a hand, comprising: a camera configured to obtain one or more optical images of a first user's hand; multiple magnetic sensors that are configured to attach to the first user's hand and provide magnetic image data corresponding to the optical image data; and a processor configured to obtain the one or more optical images and the corresponding magnetic image data to identify a position attribute from the magnetic image data corresponding to the optical image data, wherein the position attribute is not represented in the optical image data, label the optical image data using the position attribute, thereby creating a labeled image data set, and apply a machine learning algorithm to the labeled image data set to produce a mapping function.

In one embodiment, the system further comprises a calibrating system configured to calibrate the camera with the multiple magnetic sensors, wherein the optical image data is captured using the camera and wherein the magnetic image data is captured using the multiple magnetic sensors.

In one embodiment, the multiple magnetic sensors comprise low profile sensors.

In one embodiment, the mapping function is applied to an image of a second user's hand to yield one or more coordinates associated with at least one feature of the second user's hand.

In one embodiment, the machine learning algorithm comprises one of: a) a convolutional neural network and b) a randomized decision tree.

In one embodiment, a derotation heuristic is applied to the labeled image data set at any of a training phase and a testing phase of the machine learning algorithm.

In one embodiment, the derotation heuristic comprises rotating the one or more optical images of the first user's hand such that the base of the thumb of the first user's hand is positioned on the right side of the optical image.

In one embodiment, the processor is configured to label the optical image data by modeling each sensor as a three dimensionally oriented ellipsoid that is raycast into the camera frame, wherein the label for each pixel corresponds to the ellipsoid closest to the camera.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A system and method are disclosed herein to create a set of labeled images that may be applied to a machine learning system for gesture recognition. A set of images, such as may be captured by a standard camera, may be augmented with data obtained via a magnetic sensor apparatus to provide a more robust data set of images that may include information pertaining to otherwise visually obstructed features.

Figure 1B:
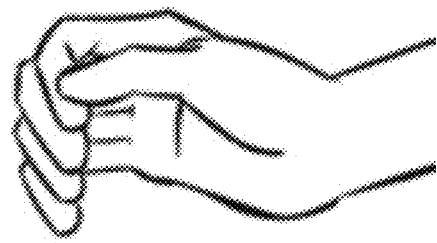
FIGS. 1A-1B illustrate images of hands in different articulations.
Figure 1A:
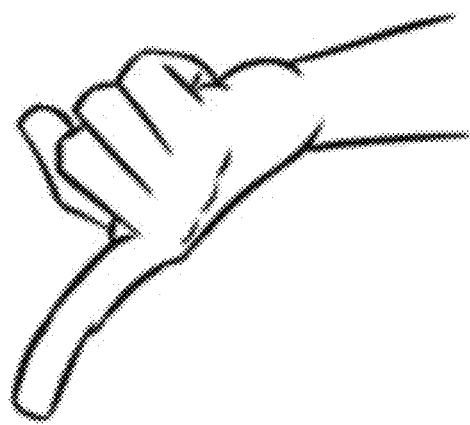

The resolution and optical constraints of typical cameras, such as feature obstruction or distortion, as well as noise, pose limitations for reliable classification of gesture recognition. Referring to FIGS. 1A-B, two exemplary hand articulations are shown. FIG. 1A shows a hand performing a 'pointing' gesture where the top portions of the digits are obstructed, and FIG. 1B shows a 'wave' gesture, where the back side of the hand is obstructed. Such feature obstruction may cause the omission of important details that impede reliable gesture recognition. Since, the human hand has approximately twenty nine degrees of freedom leading to many possible hand articulations, this poses a limitation for reliable hand gesture recognition.

Figure 2:
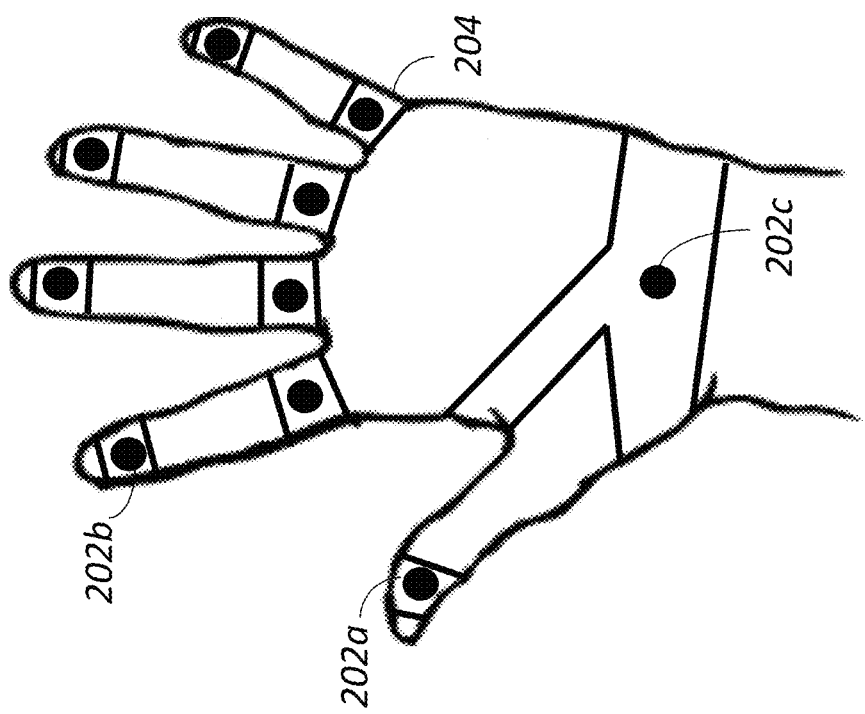
FIG. 2 illustrates a system for labeling images in accordance with an embodiment.
Figure 2:
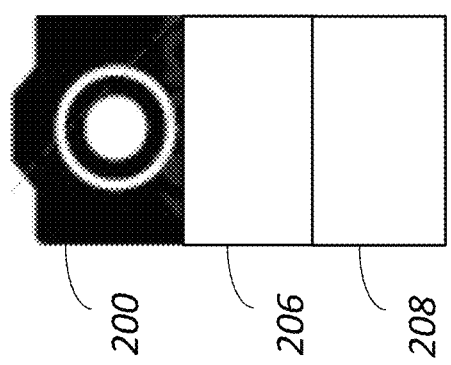

Reference is now made to FIG. 2 which illustrates a system to combine magnetic imaging with optical imaging to yield a more robust data training set, in accordance with an embodiment. Although the system of FIG. 2 refers to a human hand, any moving target that may be used for gesture recognition. For example, the head, or any limb such as the arm or leg, or digit, or other, may equally be used.

A camera 200 may be provided to obtaining an optical image, such as of a reference hand to create the training set. Additionally, a magnetic tracking system, such as a Trakstar DC magnetic tracking system, may be provided that includes a base transmitter 206 in communication with multiple sensors 202, such as low profile 2 mm sensors magnetic sensors 202a, 202b, and 202c, that may be affixed to a different joint of the reference hand. DC magnetic trackers such as the TrakStar, that are robust to metallic interference and obstruction by non-ferrous metals, may provide sub-millimeter and sub-degree accuracy for location and orientation relative to a fixed based station. By using low profile sensors, feature distortion may be reduced. Although FIG. 2 shows each finger of the reference hand disposed with two sensors, each corresponding to a different joint, in some embodiments, each finger may be provided with zero, one, or three or more sensors. The palm of the hand may be provided with one or more sensors, such as sensor 202c. Additional sensors may be affixed to the hand to correspond to additional joints.

Sensors 202 may be affixed to the reference hand via one or more attachers 204, such as thin elastic loops each provided with a pocket that secures one of sensors 200 to restrict any rotation or change of position relative to attachers 204. Attachers 204 may each fit on one of the reference hand's fingers in a manner to prevent lateral or medial movement along the finger, and to minimally impact the finger's profile, and not impede the natural motion of the fingers. For example, attachers 204 may fit as 'rings' worn on the fingers of the reference hand. Attaching the sensors using skintight elastic loops may provide a benefit over gloves in that the depth profile and hand movements are not affected by the attached sensors and thus do not pollute the data obtained by the sensors.

Sensors 202 may provide their orientation with respect to a base transmitter 206 that is provided with the tracking system, and thereby obtaining magnetic image data corresponding to the optical image data. In one embodiment, the transmitter may include a set of three coils that produce electromagnetic fields in three orthogonal directions. The magnetic field produced may be a substantially direct current (DC) magnetic field that may have little or no impact on nearby electronics. A processor 208 may be provided to analyze and process both the magnetic image data and the optical image data to create a labeled image set, as follows: Processor 208 may identify an attribute, such as one or more position coordinates obtained from one of sensors 202 that correspond to a feature of the optical image data. For example, the feature may correspond to a portion of the hand that is obstructed and is therefore not present in the optical image data. The attribute may be used to label the visual feature, to create the labeled image data set.

In this manner, data obtained from magnetic imaging may provide otherwise missed information regarding features that were obstructed optically. Similarly, the optical image data may provide a visual context to the magnetic image, and may be applied to correct for distortions and/or noise. By combining both the magnetic image data with the optic image data to create an augmented data set, reliability for gesture recognition may be improved.

Multiple images of the hand in different articulations may be obtained and labeled as described above. These labeled images may be collected to create a training set. The training set may be created in a controlled setting such as a lab, where the reference hand of the trainer may be configured with sensors as described above to derive the labeled images included in the training set. Thus created, the training set may be applied to a machine learning algorithm to derive a mapping function. Such a mapping function may be provided to any computer configured with a camera and may be used to determine one or more coordinates of an anatomical hand feature corresponding to a captured image of a user's hand in a non-lab setting, and which may be applied for gesture recognition.

Figure 3:
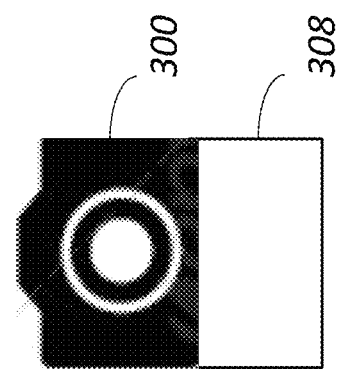
FIG. 3 illustrates a system for determining multiple position coordinates of an anatomical feature of a hand, in accordance with an embodiment.
Figure 3:
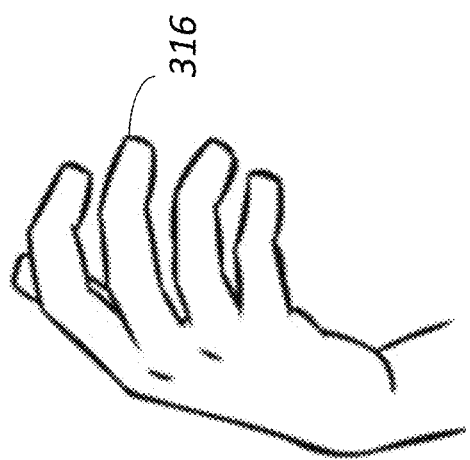

Reference is made to FIG. 3 which illustrates a system for determining multiple position coordinates of an anatomical hand feature, in accordance with an embodiment. A camera 300 configured to capture one or more images of a user's hand 316 may be provided with a computer 308. Computer 308 may be provided with the mapping function derived by applying a machine learning algorithm to a training data set that includes images labeled with coordinates obtained from multiple magnetic sensors attached to the trainer's hand, as described above. Computer 308 may receive the one or more captured images of the user's hand 316, and apply the mapping function to the received one or more images, to yield one or more coordinates associated with the user's hand. For example, computer 308 may yield one or more sets of coordinates for the digits or joints of hand 316. A more detailed implementation of this is given below.

Figure 4:
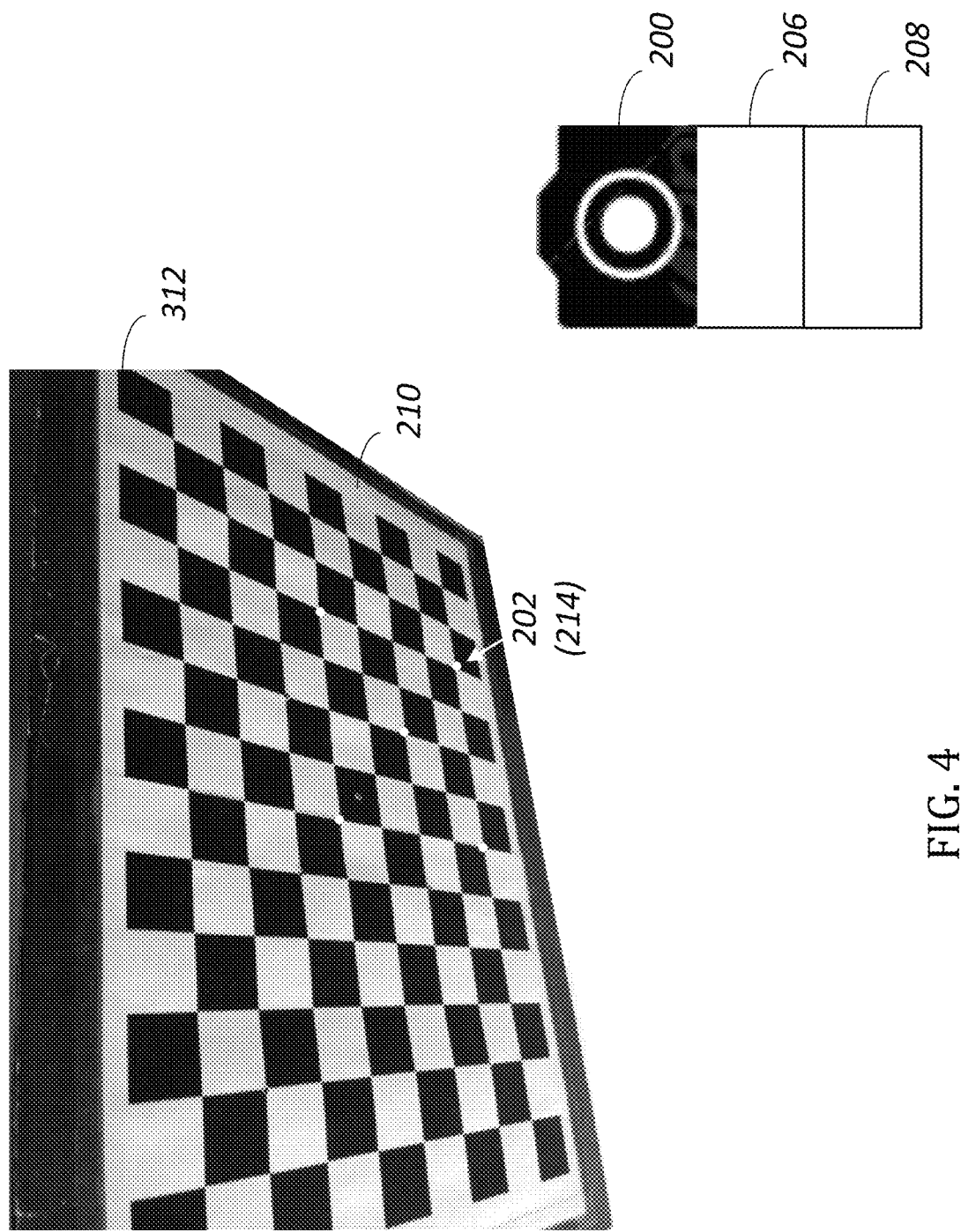
FIG. 4 illustrates a system for calibrating multiple types of sensory devices, in accordance with an embodiment.

In one embodiment, sensors 202 and base transmitter 206 described in FIG. 2 may be calibrated with camera 200 to calibrate the magnetic image data with the corresponding optical image data and reduce errors and distortion, as follows:

Reference is now made to FIG. 4, which illustrates a system to calibrate multiple types of sensory devices, in accordance with an embodiment. Processor 208 may be provided to calibrate a trainer's camera 200 with a magnetic tracking system comprising multiple sensors 202 and transmitter 206. Once calibrated, trainer's camera 200, sensors 202 and transmitter 206 may be used create the training set described above with a lower error and/or distortion. For example, trainer's camera 200 calibrated with sensors 202 may be applied to the system described for labeling multiple images of the trainer's hand to create the training data set.

In one embodiment, the magnetic tracking system may comprise a Trakstar DC magnetic tracking system that includes multiple low profile 2 mm magnetic sensors 202 in communication with a transmitter 206.

Camera 200 may be positioned adjacent to transmitter 206 and may be secured such that camera 200 and transmitter do not move relative to each other. In one embodiment, camera 200 may be mounted on top of, and fastened to transmitter 206, thereby ensuring that a first coordinate system associated with transmitter 206 is substantially aligned with a second coordinate system associated with camera 200.

A calibration pattern 210, such as a checkerboard, may be secured to a board 212. Board 212 may be of non-ferrous material, such as wood, that does not interfere with a magnetic field. Calibration pattern 210 may include multiple predetermined 'corner' locations 214, which may be highly visible in both infrared, as well as red, green and blue ('RGB') sensitive cameras and that may be detected with subpixel accuracy. The locations of each of corners 214 relative to camera 200 may be determined during a camera calibration process Sensors 202 may be affixed to calibration pattern 210 at corners 214 by fitting each of sensors 202 into a hole drilled into board 212 at each of corners 214. For example, five holes with a diameter of 2 mm may be drilled at five corner points 214 on calibration pattern 210, and each one of sensors 202 may be inserted into each hole. For example, corner points 214 may be situated at the border between the white and black 'checkers' of calibration board 210. Sensors 202 may be positioned to align the center of each sensor with the surface of calibration board 210 and may fit be positioned at the corners 214. Calibration board 210 may be made of a porous material that 'gives', such as wood or any other suitable material that tightly grips sensors 202 without damaging them, while positioned within the holes. The location of each of corners 214 relative to camera 200 may be determined in a camera calibration step in accordance with conventional methods.

Sensors 202 may be sufficiently small to not extend beyond the surface of calibration board 210, and not obstruct corner locations 214 from being captured by camera 200. Sensors 202 may provide their orientation with respect to transmitter 206, and thus may provide their location and orientation substantially relative to camera 200 positioned adjacent to transmitter 206.

The above described apparatus may be used to derive a transformation between a coordinate system of camera 200 and a coordinate system of transmitter 206, thereby enabling converting data obtained from either sensory device to the same frame of reference. For example, the coordinates obtained by transmitter 206 from sensors 202 may be transformed to the frame of reference of camera 200. The transformed coordinates may be used to annotate, or label a corresponding image captured by camera 200.

Additionally, the system describe herein may be used to account for any warping resulting from magnetic offset of sensors 402, or lens distortion from camera 200. Calibration board 212 may be positioned in multiple calibration poses, such as rotations and/or translations, and may be confined within a predefined distance from camera 200 and transmitter 206 to ensure a substantially uniform deterioration of signal reception by each of camera 200 and transmitter 206 with respect to distance. For each calibration pose, one or more optical images and corresponding magnetic images may be obtained and cross-referenced, as follows:

For each pose, each of sensors 202 may provide a processor 208 a sensor ID in association with a set of coordinates relative to transmitter 210, corresponding to its subpixel location at each one of corners 214. Similarly, camera 200 may provide processor 208 a corresponding image of calibration board 210. Processor 208 may determine a transformation, M=[R t], such as a single rigid transform, that converts the location coordinates obtained from sensors 202 and the associated sensor ID to the coordinate system of camera 200 using the location of corners 314 that were determined during the camera calibration process. In one embodiment, the transformation M may be determined by applying a least squares optimization to the data obtained from sensors 202.

A non-random offset determined between the coordinate system of camera 200 and the detected positions of sensors 202 may result from a non-linear magnetic distortion in the space in front of camera 200 and/or sensors 202. This can be corrected by measuring multiple locations for each of sensors 202 and applying a polynomial model to the obtained coordinates to directly compensate for the distortion, such as when correcting lens distortion.

The above steps may be performed by processor 208 to produce a rigid transform between the coordinate system of camera 200 and the coordinate system of sensors 202. This information may be used to project the locations of each of sensors 202 onto the camera image, and may be used to annotate, or label a region or set of pixels associated with the sensor ID.

In another embodiment, a common clock such as may be integrated with processor 208 may be defined to correctly associate information obtained from sensors 202 with the images obtained from camera 200. This may be especially relevant to moving objects whose optical and magnetic images change with time.

In another embodiment, the coordinates obtained from sensors 202 and the image obtained from camera 200 may be reverse matched by maintaining a buffer to store the most recent signals from both sensors 202 and camera 200. These signals may be matched in real time, but matching synchronously obtained signals.

For example, the Trakstar system can sample data at 420 Hz which is considerably faster than then camera frame rate of 60 Hz. Thus, a buffer of 7 Trakstar samples may be maintained for each of sensors 202. The most recent camera image may be matched to every seventh most recently obtained sample from sensors 202. These matched samples may be transformed as described above, and the image may be labeled with the synchronized magnetic signal.

In one embodiment, the 3D location coordinates of corners 214 points may be determined relative to the coordinate system of camera 200 using standard calibration techniques. These same 3D location coordinates for corners 214 may be known relative to the coordinate system of transmitter 206, α priori, as a result of their intentional positioning at predefined corners 214, resulting in a set of matched location coordinates in 3D for both the coordinate system of camera 200 as well as the coordinate system for transmitter 206. These matched location coordinates may be applied to derive the transformation between the camera system and the magnetic sensors and transmitter system.

In an embodiment, the labeled images may be collected in a database that may be applied to extract highly accurate hand and finger positions and orientations as well as pixel labels for each individual fingertip and hand and wrist joints. Such a database may be applied in a machine learning system for gesture recognition, where Deep Convolutional Networks and a Randomized decision trees may be taught to predict an orientation of the hand and location of the fingertips in three dimensions (3D) when coupled with a three-dimensional camera.

For example, the labeled images obtained using the DC magnetic tracking system, such as the Trakstar system as described above, may be used to build a large-scale database of annotated depth images of different hand orientations having three degrees of freedom (DOF).

The publication '*Rule of Thumb: Deep Derotation for improved fingertip detection*', Aaron Wetzler et al, *Proceedings of the British Machine Vision Conference* (BMVA Press), pages 33.1-33.12, September 2015, (https://dx.doi.org/10.5244/C.29.33) is hereby incorporated by reference in its entirety.

In one exemplary implementation using an Intel RealSense camera with 2 mm TrakStar magnetic sensors, the method and system described above was used to create the HandNet database, available as of Feb. 22, 2016 at http://www.cs.technion.ac.il/~twerd/HandNet/, and having 212,928 unique hand poses. The sensors were attached to each user's hand and fingertips with tight elastic loops and contained within sewn seam pockets to prevent lateral and medial movement of the sensors along the finger. Since the skintight elastic loops did not affect the depth profile of the hand, or hinder the movement of the hand, they did not pollute the data as would gloves.

To create such a database, the camera and sensor frame may be calibrated as described above, by positioning the magnetic sensors on the corners of a checkerboard pattern to create a physical correspondence between the detected corner locations and the actual sensors. The extracted 2D locations of the corner points on the calibration board, together with the sampled sensor 3D locations, may be used to solve the Perspective-n-Point problem (PnP) using the technique described in V Lepetit, F. Moreno-Noguer, and P. Fua. E-pnp: *An accurate O(n) solution to the pnp problem. International journal of computer vision*, pages 155-166, 2009, to determine the extrinsic configuration between the devices.

To annotate, or label, each image, each sensor may be modeled as a 3D oriented ellipsoid. The ellipsoid may be raycast into the camera frame and the annotation, or label for every pixel, may be set to correspond to the identity of the ellipsoid (sensor) closest to the camera. A heatmap $h_i$ may be created for each fingertip i using a similar technique, with the noted difference that the value per pixel may be defined as a gaussian distribution over the distance to the projected sensor location.

The annotated database may be created from images taken of multiple different, diverse users. For example, the HandNet database was created from images obtained from ten participants wearing the magnetic sensors: five males and five females, all having varying hand sizes. Images were captured while the participants performed random hand motions with extensive pose variation. The RealSense camera operated at a 58 frames per second (fps) rate, and produced 640×480 pixel depth maps, which were reduced to 320×240 pixels. The TrakStar system sampled measurements at a rate of 720 Hz to record a total of 256,987 images, of which a portion were removed due to low quality, yielding a final dataset of 212,928 frontal hand images having annotations for the position and orientation for each fingertip as well as the back of the palm. For each participant, the rotation and location of each sensor was adjusted with an offset for positional consistency.

Such a database may be used to train computer learning systems, such as a Deep Convolutional Neural Network (CNN) or a Randomized Decision Tree (RDT), which may be applied in a gesture recognition application to predict the orientation and location of the fingertips of a hand recorded by a 3D camera. Since hand gesture recognition poses challenges due to a) the high propensity for occlusion, and b) the many rotations that vary the appearance of the object parts, the hand space variability during both the training phase and run-time of the gesture recognition application may be substantially reduced. For example, the rotations may be learned in a regression context using the CNN, such as described in J. Tompson, M Stein, Y. Lecun, and K Perlin. *Real-time continuous pose recovery of human hands using convolutional networks. ACM Transactions on Graphics (TOC)*, 33, 2014.

To this end, a method for normalizing out the effects of rotation on highly articulated motion of deforming geometric surfaces, such as hands observed by a depth camera, is now described. Predicted orientation is combined with an in-plane derotation scheme that utilizes an inherent characteristic of hand rotations, namely that there is almost always an in-plane rotation which can be applied to an image of the hand which results in the positioning of the base of the thumb to be on the right side of the image.

Derotation in this context may be understood to be the process of warping an input image of a hand by the inverse of the detected in-plane rotation of the projection of the hand onto the image. The rotation is measured according to a canonical reference rotation and therefore the derotation process attempts to rotate the projected image back to its canonical rotation. The canonical frame of the hand in an image may be roughly defined as a hand orientation that positions the thumb on the right side of the image. The observation that an image of a hand can almost always be rotated so that the thumb is seen on the right is the insight which enables the "Rule of thumb" derotation procedure.

Derotating the hand image to such a canonical pose, instead of augmenting a dataset with all variations of the rotational degrees of freedom, may allow overcoming the ambiguity inherent in rotationally variant features.

This derotation scheme can be used to predict three degrees of freedom (DOF) orientation information on a database of hand images captured by a depth sensor, allowing location and identification of the fingertips. The detections may be overlaid on IR images from the camera which is not part of the classification process.

In one embodiment, instead of a creating a heatmap for determining positioning, the 9 coefficients of a rotation matrix may be directly predicted. A regular rotation is characterized by 3 degrees of freedom. However, by using 9 parameters with a large database, the over-parameterized output may be effectively regularized. This representation of the rotation matrix is unique in the group SO(3), unlike quaternions and Euler angles which may be noisy and unreliable, particularly when used to predict a single representative angle. For training purposes, Euclidian loss may be used and orthonormality not enforced. The output rotation matrix R of this CNN may be directly projected onto the closest unitary matrix using singular value decomposition (SVD), to yield the orientation prediction matrix $\hat{R}=[r_1, r_2, r_3]$, where $R=USV^T$. Enforcing the determinant, $det(\hat{R})=1$ yields $\hat{R}=UV^T$ as a least squares optimal projection into the group SO(3).

Figure 5:
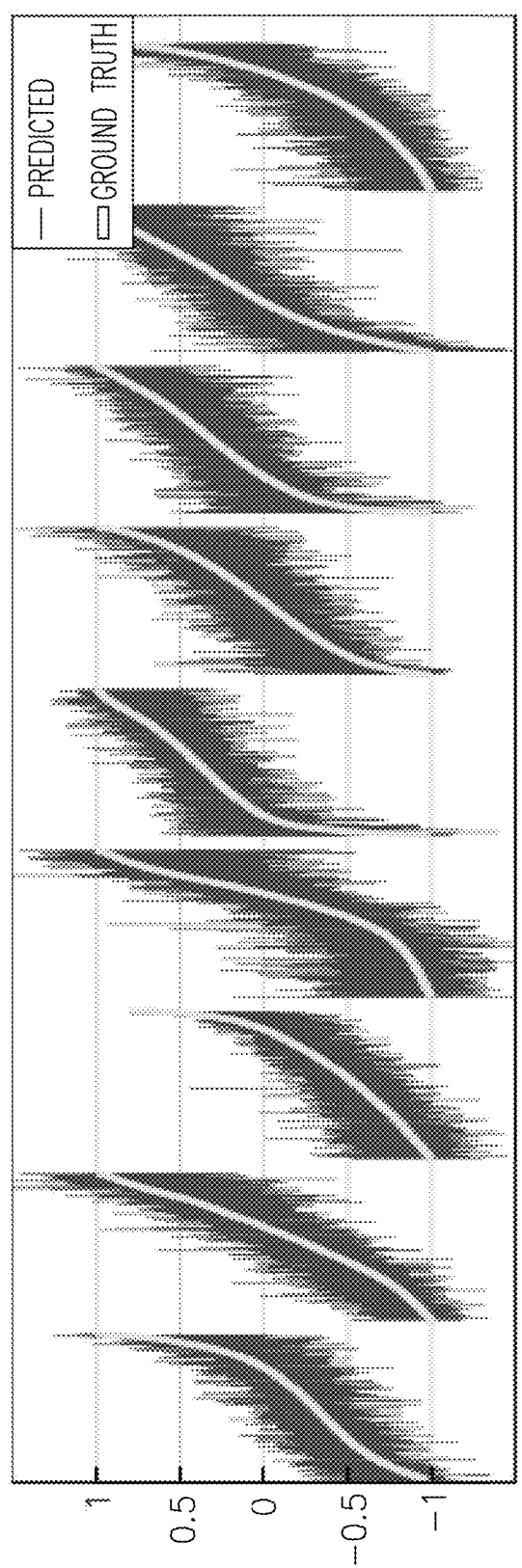
FIG. 5 shows the predicted values vs. ground truth values for the 9 coefficients of the hand orientation matrix.

Reference is made to FIG. 5 which shows the result of predicting the 9 ground truth coefficients for the HandNet database relative to the ground truth. For clarity each ground truth coefficient was ordered monotonically. This reordering was applied to the predicted results. The mean squared error for all the coefficients on the HandNet test set before and after SVD is 0.0271 and 0.0234 respectively.

To reduce pose variance, a heuristic may be applied to rotate the image of the hand such that the thumb is positioned on the right side of the image. To accomplish this, the camera image may be rotated about its center by an angle a computed using the orientation prediction $\hat{R}=[r_1 r_2 r_3]$.

Figure 6:
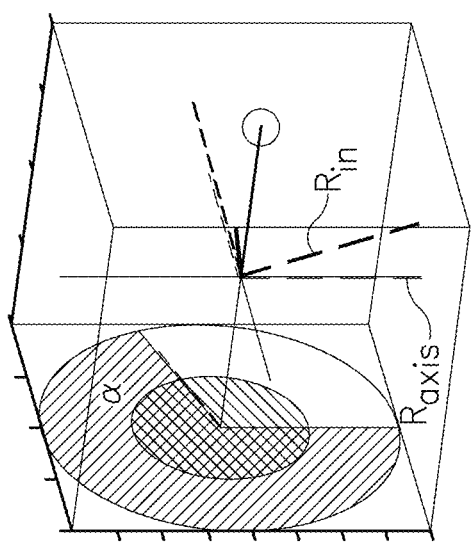
FIG. 6 shows various orientations for $R_{in}$, $R_{axis}$, and $\alpha$ when applying a derotation heuristic.
Figure 6:
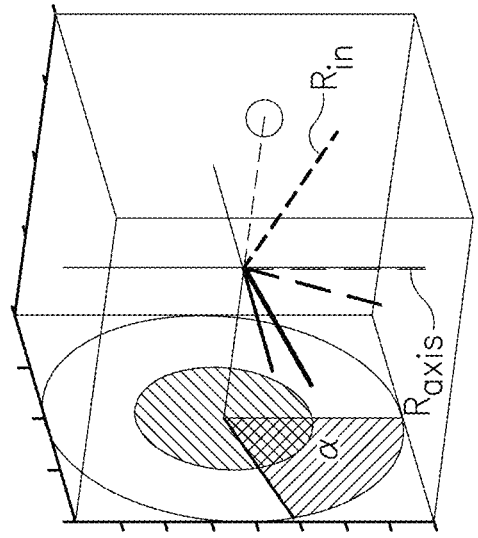
Figure 6:
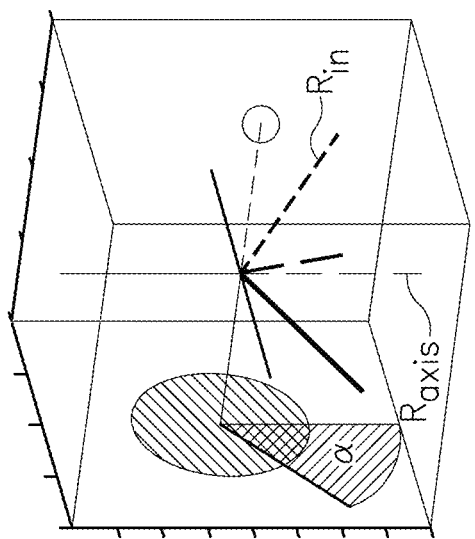
Figure 6:
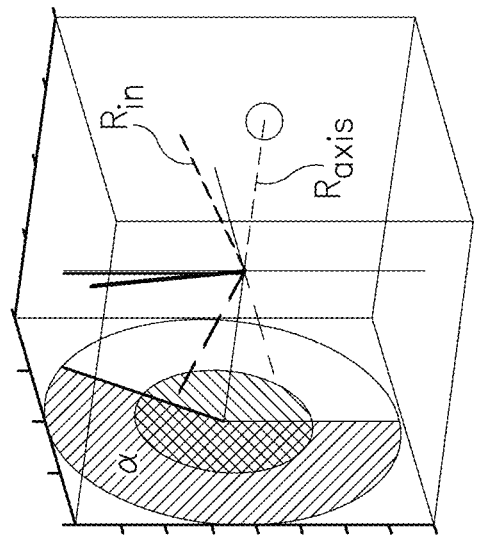

Referring to FIG. 6, the angle α with which to rotate the image may be set as the angle between the projection of a predefined axis, defined by $R_{axis}$ and the upwards image direction, defined by $R_{in}$. However, when this axis points to or away from the camera the projection onto the screen will be small and noisy. Thus, a derotation heuristic that selects an alternative axis when this condition holds may be applied. Specifically, the predicted axis $r_{align}$ most aligned with the camera z axis may be determined as $r_{align}=\text{argmax}_{r_i \in \{r_1, r_2, r_3\}} \|(0,0,1) \cdot r_i\|$. If $r_{align}$ is either in the palm pointing direction or the in direction of the extended fingers, then $r_2$ pointing in the thumb direction may be non-noisy, and $r_{orient}$ may be set as $r_{orient}=r_2$. However, if $r_{align}=r_2$, such as if the thumb direction is mostly pointing towards or away from the camera, then $r_{orient}$ may be set as $r_{orient}=r_3$, corresponding to the palm vector. An implementation of this heuristic is illustrated procedure in the following Derotation Algorithm:

Procedure Derotate (R)
$r_{align} \leftarrow \text{argmax}_{r_i \in \{r_1, r_2, r_3\}} \|(0,0,1) \cdot r_i\|$
If $r_{align} = r_2$ (thumb aligned axis) then $$\alpha \leftarrow a\tan2(r_{3x}, r_{3y}) + 90 + \begin{cases} 180 & \text{if } r_{2z} \leq 0 \\ 0 & \text{if } r_{2z} > 0 \end{cases}$$

Else
    $\alpha \leftarrow \text{atan2}(r_{2x}, r_{2y}) + 90$

End if
Return α
End Procedure

Figure 7:
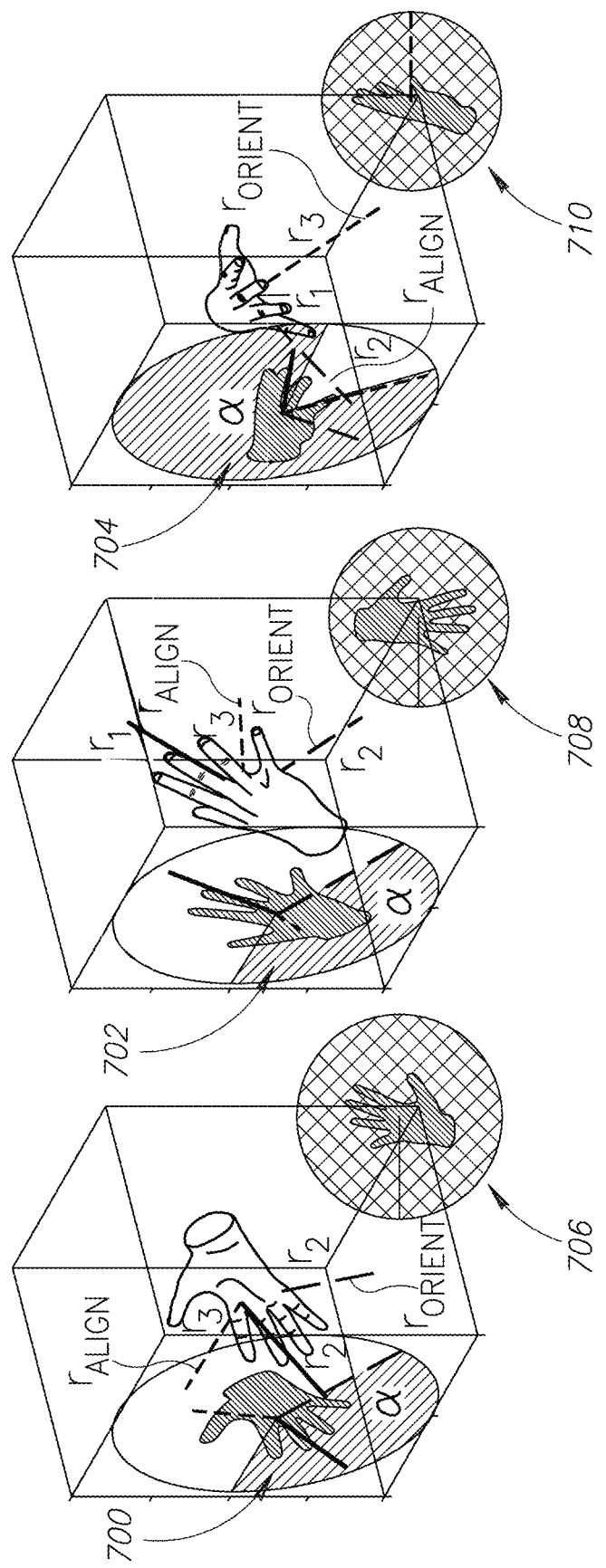
FIG. 7 illustrates synthetic implementations of applying a derotation heuristic.
Figure 8A:
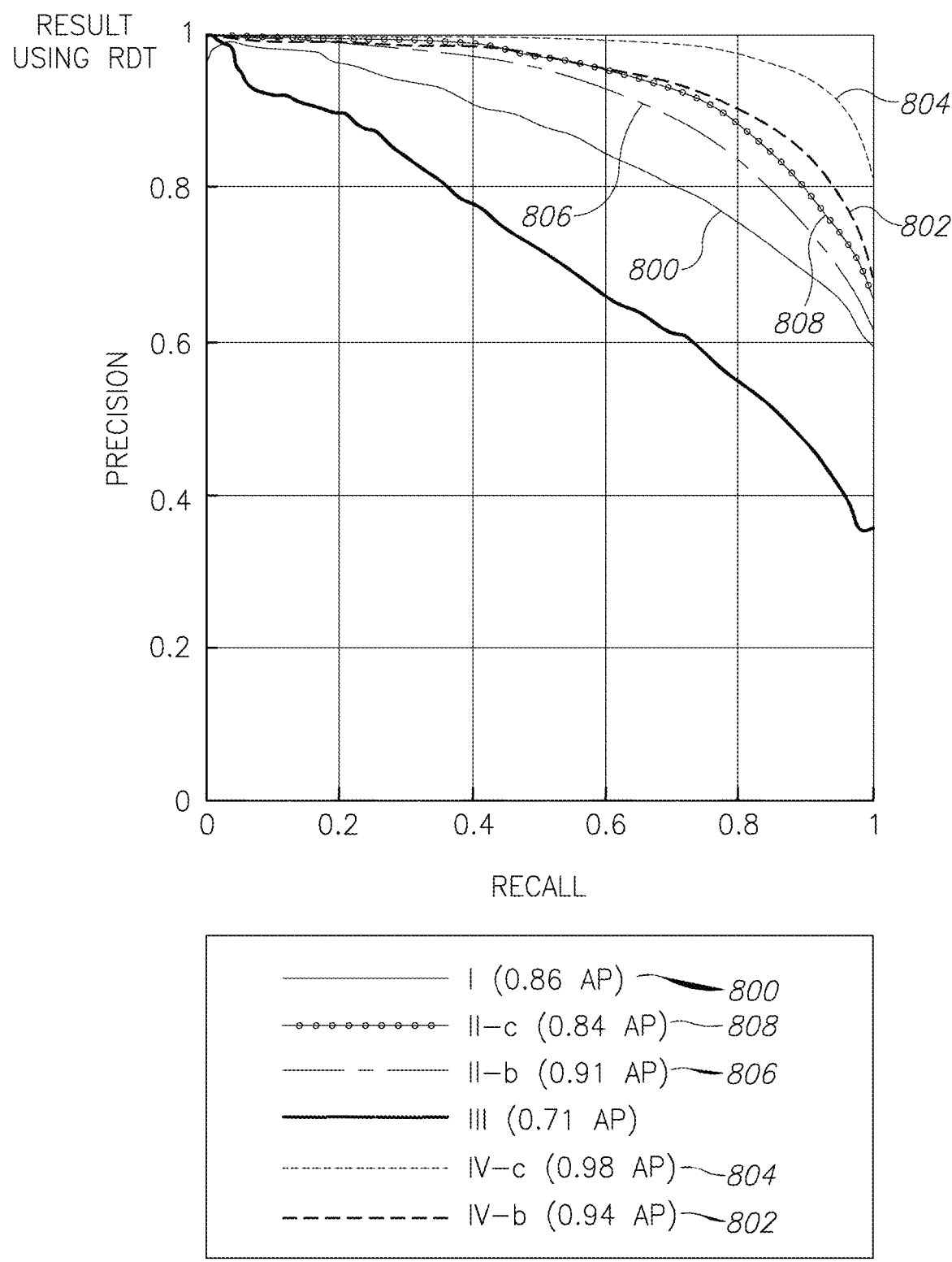
FIGS. 8A-8B show precision to recall and precision to error threshold for thumb detection using RDT on the HandNet test set.
Figure 8B:
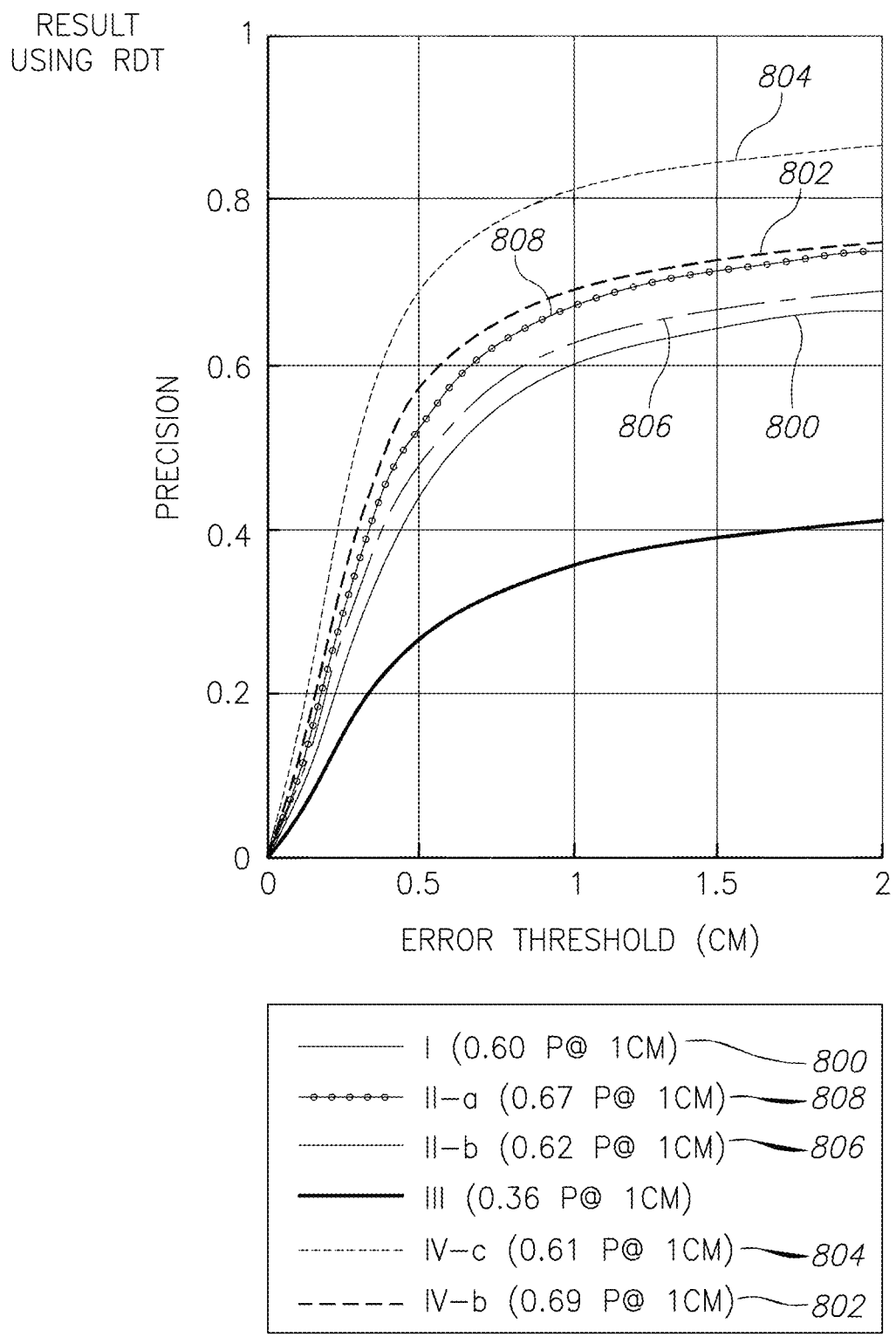
Figure 8C:
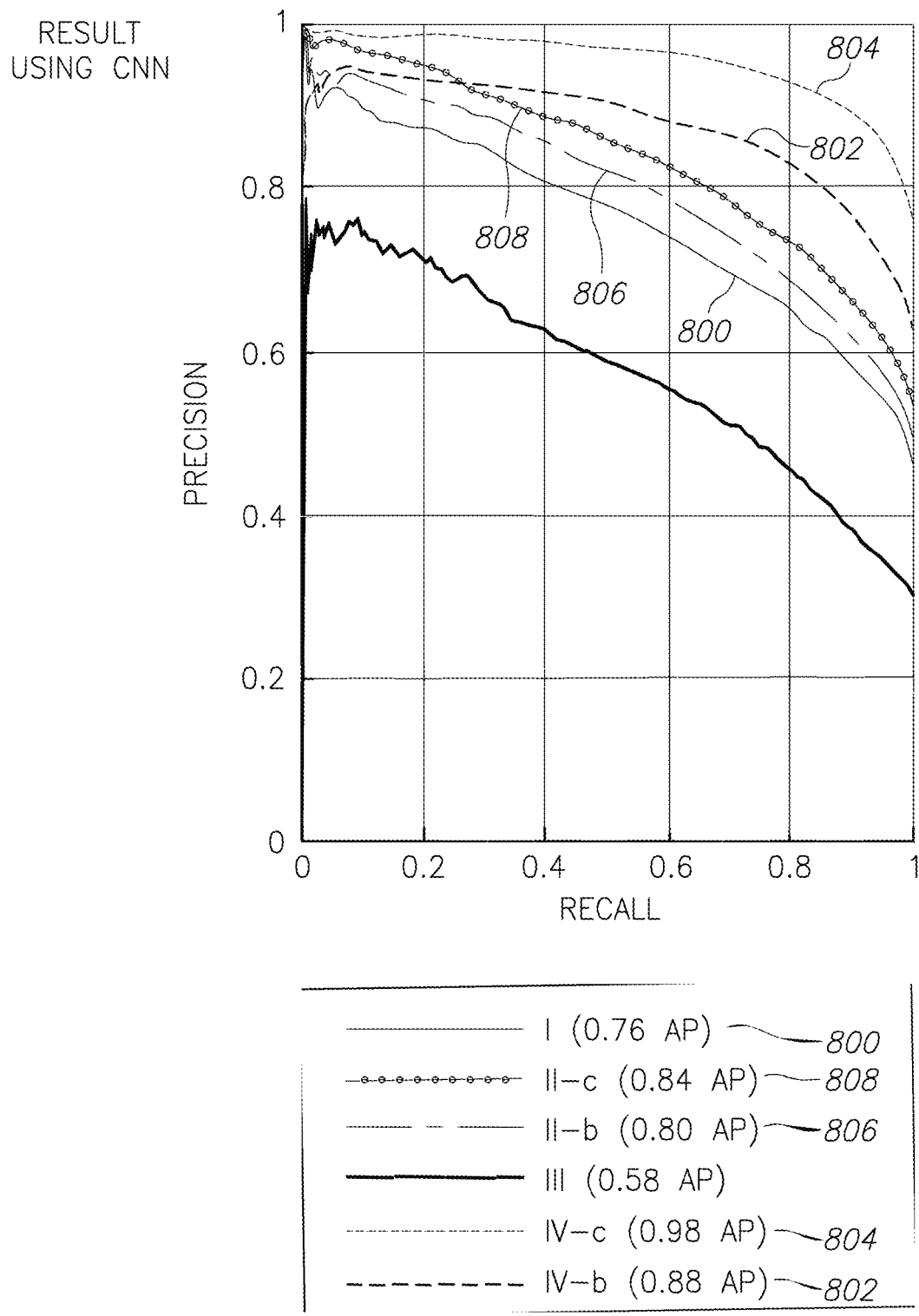
FIGS. 8C-8D show precision to recall and precision to error threshold for thumb detection using CNN on the HandNet test set.
Figure 8D:
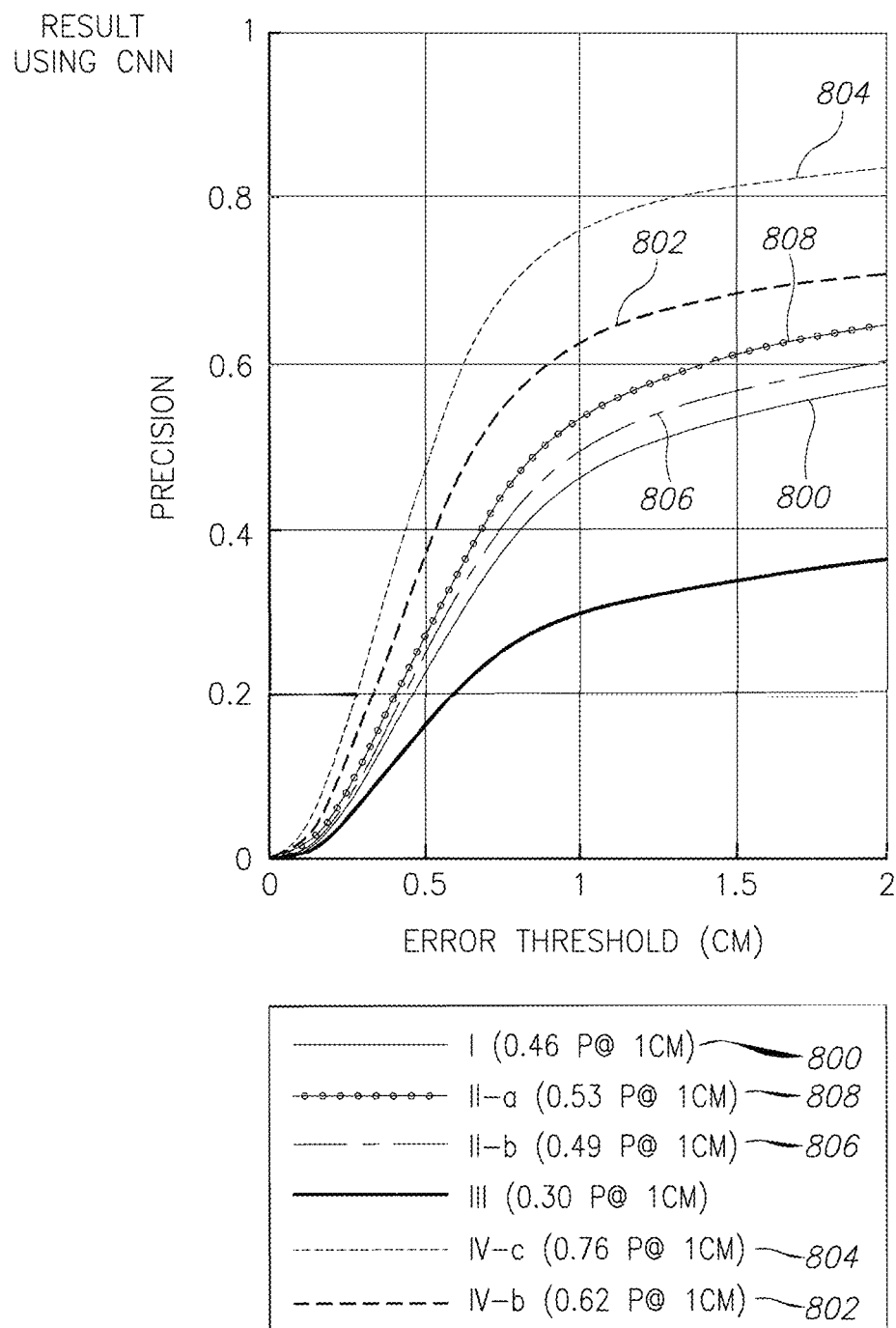

Synthetic examples of applying this heuristic are shown in FIG. 7. It may be noted that this technique is adaptable for objects other than the hand. DeROT may be defined as a method that combines using a convolution neural network to predict the orientation $\hat{R}$, while applying this derotation heuristic. FIG. 7 shows the depth projection (700, 702, 704) of the virtual hand before applying DeROT which can be seen on the left wall of the cube representing the camera plane. The axis marked $r_{orient}$ is projected onto the camera plane and used in DeROT to define the angle α. The shaded circles (706, 708, 710) contain the resulting images of the hands after applying derotation by angle a, resulting in the thumb's positioning on the right side of the image.

Optionally to using the DeROT heuristic, the principal axes of the hand silhouette may be extracted using Principal Component Analysis (PCA), and the rotation angle of the largest axis to the vertical image axis may be determined as α. The image may then be rotated by angle α about this largest axis accordingly.

Another option may be to perform a segmentation on the hand image, described in greater detail below, and determine an enclosing ellipse, such as by using a Procrustes-type algorithm over the convex hull of the points V of the hand segmentation. The minimum area of the enclosing ellipse may be found efficiently over the points $x_i \in \text{convhull}(V)$ by minimizing—$\log(\det(A))$, s. $t(x_i - \bar{x}_i)^T A(x_i - \bar{x}_i) \leq 1$ for A, $\bar{x}_i$ defining the ellipse. This may be solved using Khachiyan's algorithm, as described in B. Aspvall and R. Stone. *Khachiyan's linear programming algorithm*. pages 1-13, 1980.

A method to perform fingertip detection on a per frame basis for each captured depth image, without requiring frame-to-frame tracking or kinetic modelling is now described. The target hand may be segmented from the depth image using either a fast depth-based flood-fill method seeded either from the previous frame for real-time use and testing, or from the ground truth hand location for building the database. Using the center of mass (CoM) of the segmented hand and its average depth value, a depth dependent bounding box may be defined corresponding to the camera used to capture the depth image. For example, a bounding box of size $$w = \frac{50000}{z}$$

may be defined for a RealSense camera (HandNet) and $$w = \frac{70000}{z}$$

for a Kinect camera (NYUHands) where z is the depth of the CoM of the segmented hand. The image may be derotated about the CoM using an angle of rotation α determined as described above, such as by determining a according to the in-plane angle calculated by applying the DeROT heuristic above. This comes from the predicted full 3D orientation at run-time or from the ground truth sensor orientation for database construction or testing. The image may then be cropped using the bounding box. A learning-based fingertip detector may be used to detect the fingertips on the cropped image, accordingly, such as a random decision tree, or convolutional neural network.

When using a Random Decision Tree learning-based detector to detect the fingertips, methods may be used such as described in C. Keskin, F. Kirac, Y. Emre Kara, and L. Akarun, "*Real time hand pose estimation using depth sensors*", in *Consumer Depth Cameras for Computer Vision*, pages 119-137 Springer, 2013, and J. Shotton, A. Fitzgibbon, M Cook, T Sharp, M Finocchio, R. Moore, A. Kipman, and A. Blake, "*Real-time human pose recognition in parts from single depth images*", Conference on Computer Vision and Pattern Recognition (CVPR), pages 297-1304, 2011.

Optionally, the random binary depth attributes per pixel may be spatially distributed according to an exponential sampling pattern, such as that described by L. Stefan, C. Margarita, and S. Roland Yves in "*Brisk: Binary robust invariant scalable keypoints*", International Conference on Computer Vision (ICCV), pages 2548-2555, IEEE, 2011. Additionally, in one embodiment, only a single RDT may be used. After training the single RDT, the class distributions representing the empirical estimate of the posterior probability p(c x) of hand part label c given the image evidence x stored at each leaf may be used for inference. Inferring the most likely fingertip identity label may be performed pixel-wise by finding the label c* which maximizes p(c|x) per pixel. To address noise, such as may result from a lack of influence of neighboring classifications, a spatial regularization may be applied as follows:

for each fingertip i, treat the posterior p(c=i|x) for all pixels of the fingertip as an image, and convolve the image with a discrete two-dimensional (2D) gaussian smoothing kernel $g_\sigma$ having blur radius σ. This may correlate the posterior label distributions of nearby pixels. Therefore every pixel q may be labeled by fingertip identity (including palm and wrist labels) according to $$c^*(q, x) = \underset{i \in \{0..6\}}{\operatorname{argmax}}(g_\sigma * p_{c=i|x})(q) \qquad (1)$$

The close proximity of fingers may compromise standard mean-shift clustering. Thus, the largest label regions, or 'blobs' in the label image from Equation 1 may be detected above a certain area threshold. The 2D fingertip locations may then be assigned to the blob centers and, if necessary, the average depth value for each blob may be used to generate the 3D camera-space coordinates.

Training optimal decision trees is known to be NP-complete and therefore trees are built from the root down using breadth-first greedy optimization over tree node impurity. Optionally, the Gini impurity measure which is slightly cheaper to compute than the more typical entropy measure may be applied. To build a database for training an RDT, a predefined portion of the fingertip pixels and non-fingertip hand pixels may be extracted. For example, to build the HandNet database, 80% of the fingertip pixels and 50% of the non-fingertip hand pixels may be extracted from the training datasets, resulting in a training dataset of 500 million sample pixels totaling 600GB of data for 1200 attributes. In the HandNet example, a tree-building algorithm trained an unpruned randomized tree on 4×GTX 580 graphic processing units (GPUs) and an Intel 17 processor with 48 GB of RAM in 16 hours for a tree depth of 21 with 18000 query tests per node. It may be note that a very large number of samples may help to prevent overfitting of single RDTs.

When using a CNN architecture, methods such as described in I Tompson, M Stein, Y. Lecun, and K. Perlin, '*Real-time continuous pose recovery of human hands using convolutional networks*', ACM Transactions on Graphics (TOC), 33, 2014, and supplementary material may be used to predict the location of the five fingertips by using the maximum location in a set of heat maps that implicitly represent fingertip locations. Using the deeper convolutional layers provided by the CNN may allow extracting feature responses of highly articulated objects, such as oriented fingertips, at a higher semantic level. The heatmap based error objective may help to spatially regularize the network during training. For input to the CNN, $D_1$ may set to be the cropped depth of the image, resized to 96×96 pixels. $D_1$ may be downsample twice, each time by a factor of two, to produce $D_2$ and $D_3$, respectively. A subtractive form of local contrast normalization (LCN), such as described in K. Jarrett, K Kavukcuoglu, M Ranzato, and Y. LeCun, '*What is the best multi-stage architecture for object recognition?*', International Conference on Computer Vision (ICCV), pages 2146-2153. IEEE, 2009 and Tompson (above), may be used such that $D_i \leftarrow D_i - g_\sigma * D_i$ using a gaussian smoothing kernel $g_\sigma$ with σ=5 pixels. The triplet ($D_1$, $D_2$, $D_3$) may then be the input to the neural network. The trained network may output a heatmap $h_i$ per fingertip i for new data.

Optionally, the output for a non-fingertip heatmap that is strong may be augmented wherever a fingertip is not likely to be present. Additionally, instead of fitting a gaussian model to the strongest mode in the low resolution heatmaps, each 18×18 pixel fingertip heatmap $h_i$ may be upsampled to a fixed size of 128×128 pixels using a smoothing bi-linear interpolator. Similar to the technique described above, every pixel q may be labeled with fingertip identity (including a non-fingertip class)

$$c^*(q) = \underset{i \in \{0..5\}}{\operatorname{argmax}} h_i(q) \quad (2)$$

where the fingertip locations are given by the location of the largest label blob.

To train the CNN, both the orientation regression CNN described above as well as the described fingertip CNN may be trained using any suitable technique, such as described in Y. Jia, E. Shelhamer, J. Donahue, S. Karayev, J. Long, R. Girshick, S. Guadarrama, and T Darrell,'*Caffe: Convolutional architecture for fast feature embedding*', arXiv preprint arXiv: 1408.5093, 2014 using an NVidia GTX 980 with an i7 processor and 16 GB of onboard RAM. Training may be done both with a Euclidean loss and a batch size of 100 for 100000 iterations with stochastic gradient descent. The initial learning rate may be in the order of 0.01, and may be reduced every predetermined number of iterations, such as by a factor of 0.2 for every ten thousand iterations. Such repeated fine-tuning may help the network converge.

Experimental Results

Experiments to test the method and system described above were performed separately using two databases: the HandNet database and the publicly available database NYU-Hands. The baseline results (1) were obtained by training on non-derotated data and testing on non-derotated data. This baseline was compared to results obtained by training on non-derotated data while testing with derotated data (II), training on derotated data while testing with non-derotated data (III), and training on derotated data while testing with derotated data (IV).

For the non-derotated data, 202,928 images were randomly selected from the HandNet database for training, and the remaining 10,000 images were used for testing. For the NYUHands database, all three camera views (72,757 images per view) were used for training purposes, and the frontal view was used for testing (8,252 images). The training and testing sets were slightly diluted in accordance with the hand segmentation technique described above, resulting in 184,100 training images and 7,241 testing images.

Non-derotated data was used to train two CNN orientation regression networks, one for each dataset for experiment types (2) and (4), as well as for training the RDT and CNN fingertip detectors for experiment types (1) and (2). However, for testing the fingertip detectors in experiments (1) and (3) (testing on non-derotated data), each testing image was rotated by uniformly random in-plane rotational offsets ranging between −90 and 90 degrees, to guarantee that the testing data differs from the training data.

Derotated data was used for the training data in experiment types (3) and (4) (training on derotated data). The data was first derotated by an Oracle, implemented by DeROT defined above using the ground truth $R_{gt}$ obtained from the magnetic sensors. With experiment types (2) and (4) (testing on derotated data), the same uniform random image rotation was first applied to the test images as for experiment types (1) and (2). One of the following derotation techniques was then applied: (a) Procrustes derotation, (b) DeROT using $\hat{R}$ predicted by the CNN regression network, (c) Oracle derotation with $R_{gt}$.

Mean precision and mean average precision: Precision and recall were computed according to the protocol described in M Everingham, L. Van Gool, I Winn, C. Williams, and A. Zisserman, '*The PASCAL Visual Object Classes Challenge* 2011 (VOC2011) Results', (http://www.pascalnetwork.org/challenges/VOC/voc2011/workshop/index.html). The prediction confidence was set as the value at the location of the fingertip detection in the 128×128 channel heatmap for each fingertip. The mean precision (mP) represents the mean precision over all fingertips at a recall rate of 100%. Mean average precision (mAP) measures the mean of all the areas under the precision-recall curves for each fingertip and takes into account the behavior over all confidence values.

Error threshold: The error of a prediction was defined as the distance to the ground truth location. False positives were considered to be when the predicted distance of a fingertip was more than 6 pixels from the ground truth position. The threshold of 6 pixels roughly translates into a distance of 1 cm for both the HandNet and NYUHands databases in an image patch of size 128×128 pixels cropped as described above. 1 cm was determined to be a natural threshold, accounting for an average distance between adjacent fingertips of over 1.6 cm on average.

The following table (Table 1) summarizes the experimental results for the experiments described above:

TABLE 1

| Test set Derotation | None | | (a) Procrustes | | (b) DeROT | | (c) Oracle | |
|---|---|---|---|---|---|---|---|---|
| Method | mP | mAP | mP | mAP | mP | mAP | mP | mAP |
| HandNet | | | | | | | | |
| RDT trained on non-derotated data | *0.51* | *0.79* | 0.49 | 0.77 | 0.55 | 0.85 | 0.60 | 0.87 |
| RDT trained on derotated data | 0.32 | 0.60 | | | 0.63 | 0.88 | 0.75 | 0.95 |
| CNN trained on non-derotated data | *0.44* | *0.73* | 0.42 | 0.73 | 0.46 | 0.77 | 0.50 | 0.79 |
| CNN trained on derotated data | 0.30 | 0.59 | | | 0.61 | 0.88 | 0.74 | 0.95 |
| NYUHands | | | | | | | | |
| RDT trained on non-derotated data | *0.51* | *0.75* | 0.47 | 0.73 | 0.58 | 0.84 | 0.61 | 0.86 |
| RDT trained on derotated data | 0.35 | 0.58 | | | 0.63 | 0.88 | 0.68 | 0.89 |
| CNN trained on non-derotated data | *0.38* | *0.70* | 0.36 | 0.69 | 0.46 | 0.80 | 0.48 | 0.81 |
| CNN trained on derotated data | 0.23 | 0.42 | | | 0.49 | 0.72 | 0.53 | 0.73 |

The results in bold outperformed the baseline values shown in italics. For each row pair (derotated training data vs non-derotated training), the underlined result indicates the better of the two. For each row pair (derotated training data vs non-derotated training), the underlined result is the better of the two.

From the results shown in Table 1, Procrustes consistently reduces the quality of fingertip detection. Conversely, DeROT outperforms the baseline for every experiment. For all but one experiment, this improved performance is significantly enhanced by training on derotated data instead of original data. The results from the Oracle serve as an upper bound achievable by derotation.

Furthermore, the experiments indicates that the deep derotation method (DeROT) gave an improvement of 20.5% in mean average precision (mAP) over the baseline results for two fingertip detection in depth image approaches: a random decision tree (RDT) and a deep convolutional neural network (CNN). These results were compared to a non-learning based method similar to PCA, and which produced inferior results, indicating the improvement in fingertip detection using the DeROT method described above.

Reference is now made to FIGS. 8A-8D, which show precision to recall and precision to error threshold for thumb detection using RDT and CNN on the HandNet test set. Each line indicates an experiment which is labeled in the legend using the experiment types outlined above, and the derotation types Procrustes(a), DeROT(b), Oracle(c). Line 800 indicates the baseline. Training on derotated data and then applying DeROT (line 802), or Oracle (line 804) are indicated accordingly. Training on non-derotated data and then applying DeROT (line 806) or Oracle (line 808) are indicated accordingly. The average precision (AP) and precision at 1 cm error (P@1 cm) are shown for each thumb experiment.

These results show that the use of DeROT improves over the baseline results for all measurements for both RDT and CNN for experiments on both datasets. On HandNet, when training an RDT and CNN on ground truth derotated data, test-time use of DeROT yields improvement in mAP of 11.3% and 20.5% over the respective baselines. For NYU-Hands, DeROT gives an RDT a gain of 17.3% in mAP when trained on derotated data and a CNN achieves mAP gains of 14.2% when trained on underotated data but only a marginal gain of 2.5% when trained on derotated data. The confidence values for this specific case were not found to be reliable (which directly effects mAP) because of confusion between fingertips (specifically index and ring) and which further justified the creation of the HandNet database. For all experiments and datasets, using DeROT improves the mP results between 7.8% and 21.1% on underotated training data, and between 23.5% and 38.6% for derotated training data. For these experiments a single RDT mostly outperforms a CNN, albeit they are trained with different data and objectives.

Thus, using derotation, specifically DeROT, may significantly improve the localization ability of machine-learning based per-frame fingertip detectors by reducing the variance of the pose space. Furthermore this procedure may work despite the extremely high range of potential poses. This approach may provide an alternative to data augmentation and as a potentially useful additional step in pipelines dedicated to articulated object pose extraction such as hands.

Additionally, the system and method described above may be relevant to mobile devices with 3D cameras for calibrating and learning by different devices in different lighting scenarios and skin tones and/or 3D sensor characteristics. One advantage of the system disclosed herein is the direct use of exact camera data in a real recording scenario, thereby eliminating the need for less accurate or less reliable simulated data. Thus, the annotated data obtained by the methods described above may account for the noise and disturbance characteristics of real camera images in real situations, which may be difficult to simulate accurately.

Furthermore, the system and method described above may be applied for recording egocentric motion in a virtual reality or augmented reality scenario. In particular, these systems and methods may be used for training such a virtual and/or augmented reality system. The true motion of a trainer's hands may be recorded from a first-person point-of-view by attaching the camera to the trainer's head such that the camera faces the trainer's hands. Using a depth generating camera system, such as a structured light scanner or stereo camera reconstruction setup to obtain such automatically labeled data for use by a machine learning system may provide a powerful tool for use by Virtual Reality (VR) and AR systems where markerless detection and tracking of a user's hands may be critical for a useful user experience.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive a plurality of images of an articulated object,
   receive, with respect to each image of said plurality of images, sensor data indicating a three-dimensional (3D) location of one or more features of said articulated object in said image,
   at a training stage, train a machine learning algorithm on a training set comprising:
   (i) said plurality of images, and
   (ii) labels representing said 3D locations, and
   at an inference stage, apply said trained machine learning algorithm to a target image of a target articulated object of the same type, to determine a three-dimensional location within said target image of said one or more features of said target articulated object.

2. The system of claim 1, wherein said images are labeled with said labels.

3. The system of claim 1, wherein said program instructions are further executable to estimate a position and orientation of said articulated object, based, at least in part, on said determining.

4. The system of claim 1, wherein said articulated object is one of a hand, a finger, an arm, a leg, a limb, and a head.

5. The system of claim 1, wherein said articulated object is a hand, and wherein said one or more feature are at least one of: a digit of said hand, a fingertip of said hand, a joint of said hand, and a palm of said hand.

6. The system of claim 1, wherein said sensor data is magnetic sensor data received from magnetic sensors attached to said one or more features.

7. The system of claim 6, wherein said obtaining comprises determining a correspondence between a first coordinate system represented in said sensor data and a second coordinate system represented in said plurality of images.

8. A method comprising:
   receiving a plurality of images of an articulated object;
   receiving, with respect to each image of said plurality of images, sensor data indicating a three-dimensional (3D) location of one or more features of said articulated object in said image;
   at a training stage, training a machine learning algorithm on a training set comprising:
   (i) said plurality of images, and
   (ii) labels representing said 3D locations; and
   at an inference stage, applying said trained machine learning algorithm to a target image of a target articulated object of the same type, to determine a three-dimensional location within said target image of said one or more features of said target articulated object.

9. The method of claim 8, wherein said images are labeled with said labels.

10. The method of claim 8, further comprising estimating a position and orientation of said articulated object, based, at least in part, on said determining.

11. The method of claim 8, wherein said articulated object is one of a hand, a finger, an arm, a leg, a limb, and a head.

12. The method of claim 8, wherein said articulated object is a hand, and wherein said one or more feature are at least one of: a digit of said hand, a fingertip of said hand, a joint of said hand, and a palm of said hand.

13. The method of claim 8, wherein said sensor data is magnetic sensor data received from magnetic sensors attached to said one or more features.

14. The method of claim 13, wherein said obtaining comprises determining a correspondence between a first coordinate system represented in said sensor data and a second coordinate system represented in said plurality of images.

15. A computer program product comprising a non-transitory computer-readable storage medium having program instructions embodied therewith, the program instructions executable by at least one hardware processor to
receive a plurality of images of an articulated object;
receive, with respect to each image of said plurality of images, sensor data indicating a three-dimensional (3D) location of one or more features of said articulated object in said image;
at a training stage, train a machine learning algorithm on a training set comprising:
(i) said plurality of images, and
(ii) labels representing said 3D locations; and
at an inference stage, apply said trained machine learning algorithm to a target image of a target articulated object of the same type, to determine a three-dimensional location within said target image of said one or more features of said target articulated object.

16. The computer program product of claim 15, further comprising estimating a position and orientation of said articulated object, based, at least in part, on said determining.

17. The computer program product of claim 15, wherein said articulated object is one of a hand, a finger, an arm, a leg, a limb, and a head.

18. The computer program product of claim 15, wherein said articulated object is a hand, and wherein said one or more feature are at least one of: a digit of said hand, a fingertip of said hand, a joint of said hand, and a palm of said hand.

19. The computer program product of claim 15, wherein said sensor data is magnetic sensor data received from magnetic sensors attached to said one or more features.

20. The computer program product of claim 19, wherein said obtaining comprises determining a correspondence between a first coordinate system represented in said sensor data and a second coordinate system represented in said plurality of images.

* * * * *